W. M. AND C. J. DOERING.
CONTAINER AND DISPLAY CARTON.
APPLICATION FILED JULY 2, 1920.
1,405,505.
Patented Feb. 7, 1922.
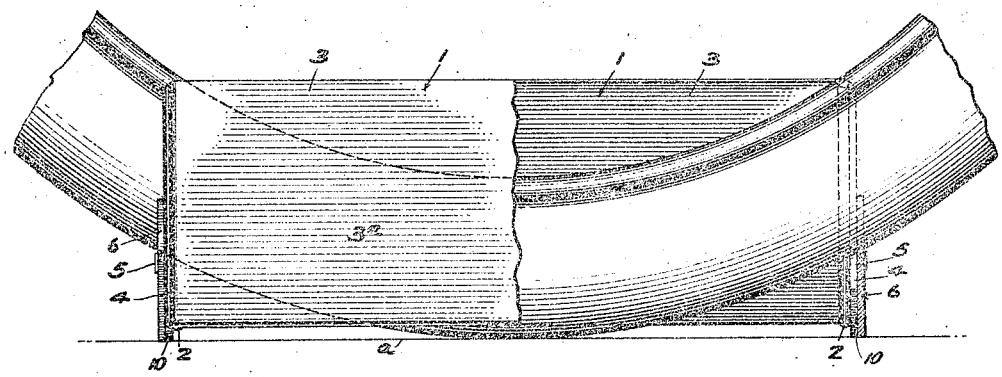
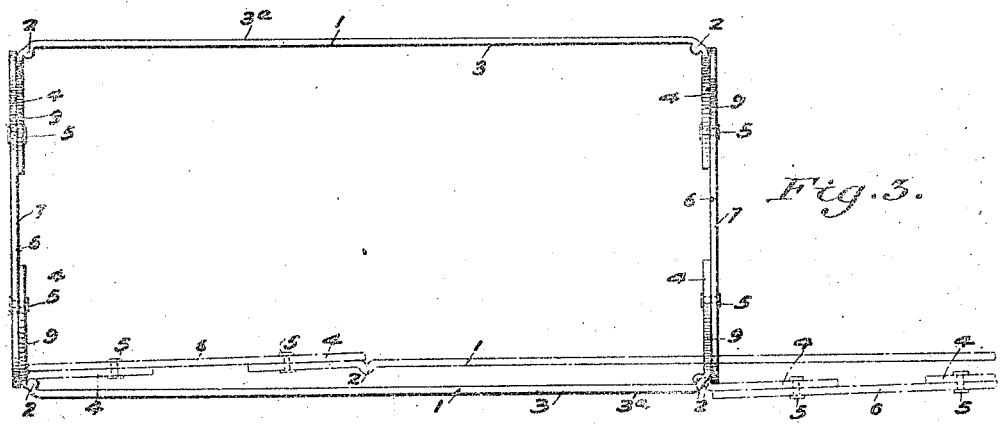
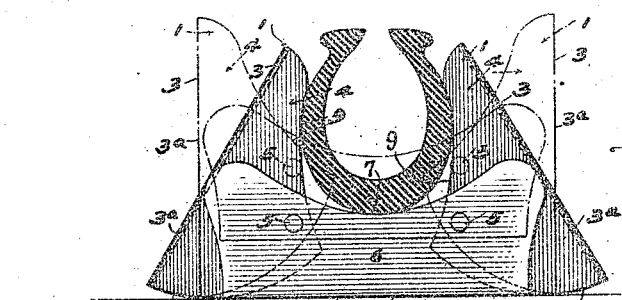

UNITED STATES PATENT OFFICE.

WILLIAM M. DOERING AND CHARLES J. DOERING, OF CINCINNATI, OHIO.

CONTAINER AND DISPLAY CARTON.

1,405,505. Specification of Letters Patent. Patented Feb. 7, 1922.

Application filed July 2, 1920. Serial No. 393,650.

*To all whom it may concern:*

Be it known that we, WILLIAM M. DOERING and CHARLES J. DOERING, citizens of the United States, and residing at Cincinnati, in the county of Hamilton and State of Ohio, have invented a new and useful Improvement in Container and Display Cartons, of which the following specification is a full disclosure.

This invention relates to display and advertising racks, especially designed for exhibiting tires, and is companion to an application filed of the same date, Serial No. 393,649.

The objects are to provide a display support for tires, that may be cheaply manufactured from cardboard stock, or the like, to provide means for clamping a tire within the support in an upright position in which the weight of the tire actuates the clamping means, and to provide two plane surfaces for displaying advertising matter.

Additional objects are to form the elements of the rack from cardboard stock assembled into a strong and durable structure and to so construct the rack that it may be folded in a compact form, for shipping and storage purposes.

Other objects and certain advantages will be set forth in the description, and special reference is made to the drawings, forming a part of this specification, in which:

Fig. 1 is a side elevation, partly in section, showing the rack with a portion of a tire clamped therewithin.

Fig. 2 is an end elevation of Fig. 1, showing in dot-and-dash lines the position of the part previous to the inserting and clamping of the tire.

Fig. 3 is a top plan showing the parts in position corresponding to that shown by dot-and-dash lines in Fig. 2, the folded or knock-down position being shown by dot-and-dash lines.

In carrying out our invention, we provide two substantially rectangular sheets of cardboard 1, cut to a particular outline and scored or punched as at 2, to form the vertical side walls 3, and end walls or flaps 4, which when folded at right angles to the side walls 3 provide jaw members for engaging the tire. The said sections 1 are placed in opposition to one another to form a rectangular box-like structure and the pairs of end flaps or jaw members at each end are pivotally connected as at 5 by a bridge or cross member 6. The bridge member 6 is curved as at 7, at its top, and has a flat bottom edge 8. The jaws have curved engaging edges 9 and curved bases 10, which act as rolling fulcrums.

The initial position of the parts is shown in dot-and-dash lines in Fig. 2, and when so placed the side walls 3 are in a vertical position, the bridge or cross members 6 raised, and the jaws open. A tire is then set upon the curved surfaces 7, the weight of the same depressing the bridge members, causing the jaws to approach the tire on each side, and clamp the same, as shown in Fig. 2, the bridge member finally contacting the surface a, at which time the jaws are fully engaged about the tire. Through the inward motion of the jaws, the side walls 3 are swung at an angle, to fully display the advertising matter placed upon their surfaces 3ª. The end flaps or jaws, when the tire is clamped therebetween, inclines the side walls making the display matter more predominating and legible.

As shown by dot-and-dash lines in Fig. 3, the rack is designed to be folded to a flat or knock-down position, the scoring or punching 2 facilitating such an operation.

Having described our invention, we claim:

1. In a display and advertising rack, two rectangular sections each having angle extensions at its opposite ends, the sections juxta-posed to form a box-like structure, open at its top and bottom, the angle extensions of said sections forming jaws for clamping a tire, having their base edges curved for rocking the opposing jaws toward each other, and a bridge member for each pair of opposing extensions pivotally attached to the extensions to rock the extensions toward each other when a tire is placed upon the bridge member.

2. In a display and advertising rack, two rectangular sections juxtaposed to form a box-like structure, open at its top and bottom, ends on said rectangular sections forming jaws for clamping a tire and having curved base edges for rocking the sections and their jaws toward each other, and a bridge member pivotally attached to opposing jaw ends of said sections, to rock the opposing jaw ends toward each other when a tire is placed thereon, the sides of said box-like structure being angularly adjusted by the clamping action of said jaws.

3. In a display and advertising rack, a box-like structure formed from two sheets of cardboard, each sheet near its ends being scored and bent to form coacting jaws, bridge members respectively pivotally attached to a pair of opposing jaws, the said bridge members acting to contract said jaws and simultaneously therewith to angularly adjust the sides of said box-like structure.

4. In a display and advertising rack, a rectangular frame structure, formed by scoring two sheets of cardboard and bending the ends of the said sheets to form end walls, shaping said end walls to form opposed clamping jaws, and pivotally connecting said jaws by a bridge member for causing a clamping action of said jaws, when a tire is placed upon said bridge member and between said jaws.

5. In a tire casing display and supporting rack, a pair of side walls, each having end flaps, adapted to be bent at right angles to their respective side walls cross members at the opposite ends of said side walls pivotally connecting respectively with relative opposite end flaps for uniting the parts in a box-like structure, and for swinging the opposed end flaps toward each other upon depressing said cross members for clampingly holding a tire casing between the end flaps and within the structure.

6. In a tire casing display and supporting rack, a pair of opposed side walls, each having flaps at the opposite ends adapted to be bent at right angles to their respective side walls, and cross members pivotally connected to the corresponding opposed end flaps of said walls, to unite the parts into a box-like structure, adapted to clampingly receive and support a tire casing between the edges of said end flaps.

7. In a display and advertising rack, a pair of opposite side walls, each wall at its opposite ends having angle extensions providing jaws, each respectively to cooperate with a corresponding jaw of the opposite wall, and cross members pivotally connected to the opposing pairs of jaws of said walls, arranged to structurally connect the walls and receive the article to be supported, utilizing the weight thereof to swing the opposing jaws, clamping therebetween the article supported upon said cross member.

8. A support of the class described, comprising a pair of opposing jaw members, each having curved base edges, and a cross member pivotally connected to said jaws to support an article between the jaws and utilize the weight thereof for rocking said jaws upon their base edges toward each other to develop a clamping pressure against the sides of the supported article.

9. A support of the class described, comprising pairs of opposing clamping members, each provided with a curved base edge, a cross member for pivotally connecting an opposing pair of members, said members above the cross member being formed to embrace the sides of an annulus to be supported and the cross member arranged to utilize the weight of the annulus thereupon to rock said members and develop a clamping pressure against the sides of the annulus, and means to connect the pairs of members for mutual support.

In witness whereof, we hereunto subscribe our names, as attested by the two subscribing witnesses.

WM. M. DOERING.
CHARLES J. DOERING.

Witnesses:
L. A. BECK,
J. C. JUNIUS.